United States Patent [19]
Valentine

[11] Patent Number: 6,070,076
[45] Date of Patent: *May 30, 2000

[54] IDENTIFICATION OF MOBILE CALLS WITHIN A MOBILE TELEPHONE SYSTEM

[75] Inventor: Eric Valentine, Plano, Tex.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,086

[22] Filed: Dec. 22, 1995

[51] Int. Cl.$^7$ .................................................. H04Q 7/24
[52] U.S. Cl. .......................................... 455/445; 455/436
[58] Field of Search ................................... 455/445, 406, 455/435, 432, 433, 439, 438, 437, 407, 408, 461

[56] References Cited

U.S. PATENT DOCUMENTS

| | | | |
|---|---|---|---|
| 3,829,617 | 8/1974 | Caithamer et al. | 179/7.1 R |
| 4,112,257 | 9/1978 | Frost | 179/2 EB |
| 4,233,473 | 11/1980 | Frost | 179/2 EB |
| 4,698,839 | 10/1987 | DeVaney et al. | 455/560 |
| 4,876,738 | 10/1989 | Selby | 455/435 |
| 4,979,207 | 12/1990 | Baum et al. | 379/112 |
| 5,003,584 | 3/1991 | Benyacar et al. | 379/119 |
| 5,008,929 | 4/1991 | Olsen et al. | 379/112 |
| 5,027,388 | 6/1991 | Bradshaw et al. | 379/112 |
| 5,063,591 | 11/1991 | Jodoin | 379/115 |
| 5,133,004 | 7/1992 | Heileman, Jr. et al. | 379/67 |
| 5,148,472 | 9/1992 | Freese et al. | 455/408 |
| 5,185,785 | 2/1993 | Funk et al. | 379/111 |
| 5,218,632 | 6/1993 | Cool | 379/126 |
| 5,291,543 | 3/1994 | Freese et al. | 455/408 |
| 5,303,286 | 4/1994 | Wiedeman | 455/428 |
| 5,311,572 | 5/1994 | Friedes et al. | 379/67 |
| 5,345,498 | 9/1994 | Mauger | 455/406 |
| 5,384,829 | 1/1995 | Heileman, Jr. et al. | 379/67 |
| 5,444,773 | 8/1995 | Hirsohn et al. | 379/219 |
| 5,448,623 | 9/1995 | Wiedeman et al. | 455/430 |
| 5,448,632 | 9/1995 | Iyob et al. | 379/201 |

FOREIGN PATENT DOCUMENTS 0 483 091 A2  10/1991  European Pat. Off. .
WO 95/22230  8/1995  WIPO .

Primary Examiner—Dwayne D. Bost
Assistant Examiner—Myron K. Wyche
Attorney, Agent, or Firm—Jenkens & Gilchrist, P.C.

[57] ABSTRACT

The SS7 network signalling address of a serving exchange for a cellular system is used to construct a unique network call identifier for a mobile call. This unique network call identifier is communicated across the networks to allow multiple serving exchanges associated with a roaming subscriber to produce call data records to a separate network or a node and have it correlate the billing records with a single call. Every mobile call within the cellular networks will have a unique call identifier, and this call identifier is communicated from the anchor exchange to the serving exchange during an interexchange handoff process to identify the transferring call across the network.

27 Claims, 6 Drawing Sheets

IDENTIFICATION OF MOBILE CALLS WITHIN A MOBILE TELEPHONE SYSTEM

BACKGROUND OF THE INVENTION

1. Technical Field of the Invention

The present invention relates to mobile radio telephone systems and, in particular, to a method and apparatus for identifying a call within a mobile telephone system.

2. Description of Related Art

When a mobile subscriber originates or receives a phone call, a mobile telephone switching office ("MTSO") (also referred to as a mobile switching center (MSC) or exchange) collects charging data during the call and outputs it in the form of a call billing record (a "toll ticketing record" or a TT record) at the end of the call. Such charging data may include, for example, a call identification number, the mobile station number, the subscriber number, the number called and the time duration of the call. These billing records are then stored on a recording medium such as a magnetic tape or a hard disk and are later processed to produce telephone bills that can be sent to the subscribers. The recorded charging data, such as the subscriber number, enable the billing center to retrieve and correlate all the charges belonging to a particular subscriber and produce a single telephone bill for that subscriber.

When two or more adjacent cellular radio coverage areas having different serving exchanges sharing a geographical boundary are provided, roaming functions within the cellular system allow calls to start in one exchange and terminate in another. Therefore, when a moving mobile station having a call in progress crosses the boundary between two adjacent systems, the call is "handed over" from the initial exchange ("anchor exchange") to the second exchange ("serving exchange"). Thus, calls are handed over not only from cell to cell during the normal course of operation within a cellular communication exchange but also from one exchange to another. The process of handing over calls from one exchange to another is called an interexchange handoff or an intersystem handoff.

If a cellular call is served entirely by the anchor exchange, all incurred fees are recorded by the anchor exchange and later outputted in the form of call billing records. However, if the mobile travels through and uses the cellular communication facilities of more than one MTSO, each MTSO produces a billing record to represent the service it provided to the roaming subscriber during the call. Because of the fact that no subscriber wants multiple bills for a single call, the billing system has to somehow correlate the services provided by the multiple exchanges and consolidate all the separate billing records from the multiple serving exchanges into a single bill. Conventionally, as soon as a serving exchange is no longer servicing the mobile station, either because that mobile station has traveled out of the current coverage area or has terminated the call, the serving exchange produces the necessary billing records and transports them back to the anchor exchange using the same telecommunications network used by the mobile station during the call. However, this puts additional traffic demand on the telecommunication network and creates undesirable system effects. Alternatively, each serving exchange could separately dump the billing records into a separate network or to a magnetic tape. But, because of a lack of common identifier, those billing records received from multiple serving exchanges cannot easily be correlated with each other and to a particular call the mobile subscriber has made utilizing those multiple serving exchanges. In other words, the conventional system does provide a mechanism for correlating different mobile calls to a particular subscriber but does not have a mechanism for correlating a number of different logical legs of a single mobile call.

SUMMARY OF THE INVENTION

The present invention advantageously provides a unique network call identifier within a cellular system for identifying and correlating a number of separate interexchange handoff call connections with a single mobile call. Each call is identified by a SS7 network signalling address of the serving MSC or node, and the identification is transported across the network when an interexchange handoff occurs. By communicating the unique network call identifier across the network, each serving MSC for a roaming subscriber can produce billing records for the multiple legs involved in the call that are identified by the same unique network call identifier. This identification enables the correlation of billing records received by the serving MSCs with each other without burdening the telecommunications network.

In one aspect, the present invention includes a method and apparatus for uniquely identifying a call within a wireless cellular network by using a unique call identifier generated from the SS7 network signalling address associated with the exchange or node servicing the mobile subscriber.

In another aspect, the present invention includes a method for selecting one of the serving cellular exchanges, retrieving the selected exchange's network address, generating a unique local call identifier within the selected exchange, and creating a unique network call identifier for a call serviced by the selected cellular exchange by concatenating the selected exchange's network address with the unique local call identifier.

In still another aspect, the present invention provides a method for enabling one of the serving exchanges to assign a unique call identifier for an incoming call, originating call and transferring call within a telecommunications network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
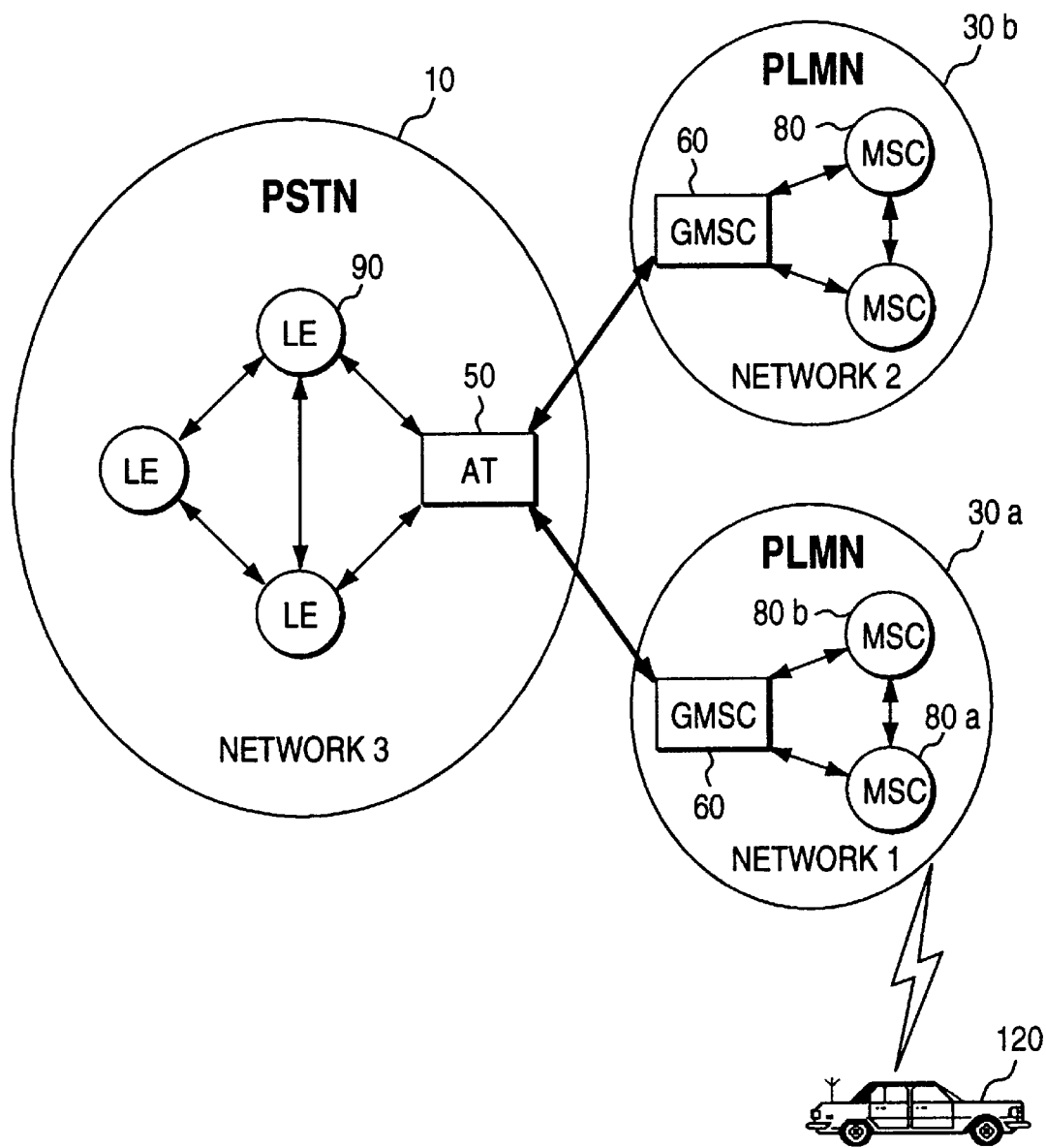
FIG. 1 illustrates the interconnection of multiple Public Land Mobile Networks (PLMN) to a Public Switched Telephone Network (PSTN)

FIG. 1 illustrates the network interconnection of multiple Public Land Mobile Networks (PLMN) 30 to a Public Switched Telephone Network (PSTN) 10. A mobile subscriber (MS) 120 is associated with one of the PLMNs 30 as the Home PLMN 30a. Within each PLMN 30, there are a number of different mobile switching centers (MSC) 80 servicing the geographical areas covered by the network. A MS 120 served by one of the PLMN 30 communicates with other wireless and wire-line terminals by connecting to the Public Switched Telephone Network (PSTN) 10 through its Gateway Mobile Switching Center (GMSC) 60. The access tandem (AT) 50 within the PSTN 10 routes the mobile calls generated from the PLMN 30 to wire-line terminals serviced by one of its exchanges within the PSTN 10, or to another PLMN 30 by a way of its GMSC 60. If a mobile subscriber travels outside of the coverage area of the current servicing PLMN 30a and roams into the geographical area covered by another PLMN 30b, an interexchange handoff occurs between the PLMN 30a to the PLMN 30b, and telecommunications service continues to be provided to the MS 120 from the new PLMN as a roaming subscriber.

Figure 2:
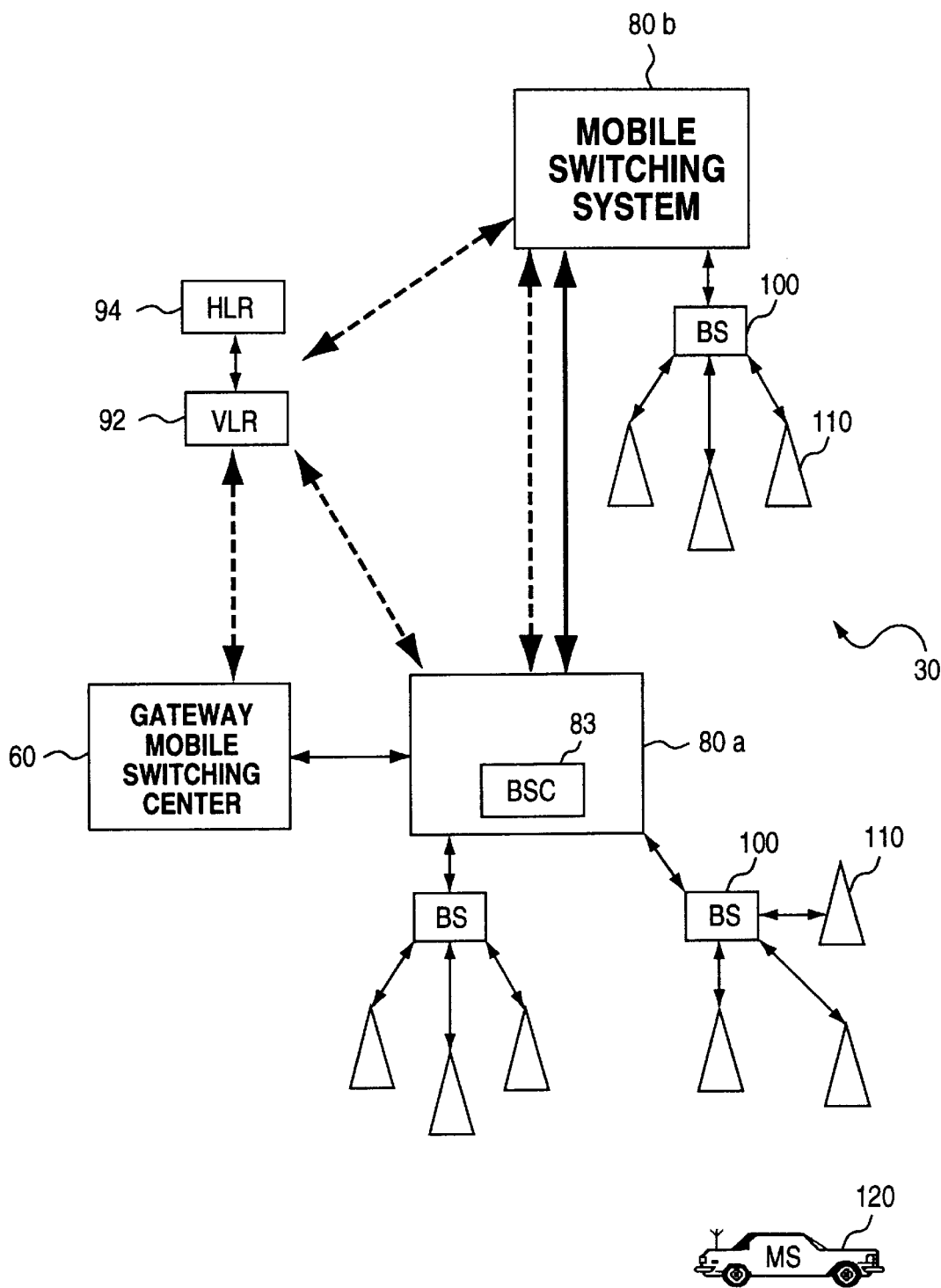
FIG. 2 is a block diagram of a PLMN.

FIG. 2 is a block diagram of a PLMN 30 including a mobile switching center 80, a home location register (HLR) 94 and a gateway mobile switching center (GMSC) 60. A PLMN 30 comprises a mobile switching center (MSC) or base station system 80, which includes a base-station controller (BSC) 83 and one or more base-station transceiver stations (BS) 100, a home location register (HLR) 94, a visitors location register (VLR) 92, and a number of antenna systems 110. Every subscriber (mobile station MS) 120 is allocated to a home network, this being achieved by making an entry in the HLR 94. Whenever a MS 120 is switched on, and possibly at regular intervals thereafter, it will register with the system 30 and give its location area (group of cells). The subscriber's data will further be added to the VLR 92 of the then serving MSC 84.

Each MSC 80 communicates directly with the HLR 94 and the VLR 92 for subscriber information and transfers calls from one BSS to the other as the mobile subscriber travels within the PLMN's geographical coverage area. Furthermore, the gateway mobile switching center (GMSC) 60 acts as a gateway to allow access to other wire-line terminals within the PSTN 10 or wireless mobile subscribers associated with other PLMN 30.

Each of the MSC 84 and the HLR 94 assigned to the PLMN 40 is typically connected to other networks via Signalling System No. 7 (SS7) network protocols and is assigned a unique network address to allow packet communication to be done within the network. The present invention discloses a method and system for utilizing such network addresses to construct a unique call identifier for a mobile call. Since these network addresses are mandatory for the existence and operation of the existing SS7 network, utilizing such network addresses avoids modifying the existing networking system to provide a unique call identifier across the networks.

Figure 3:
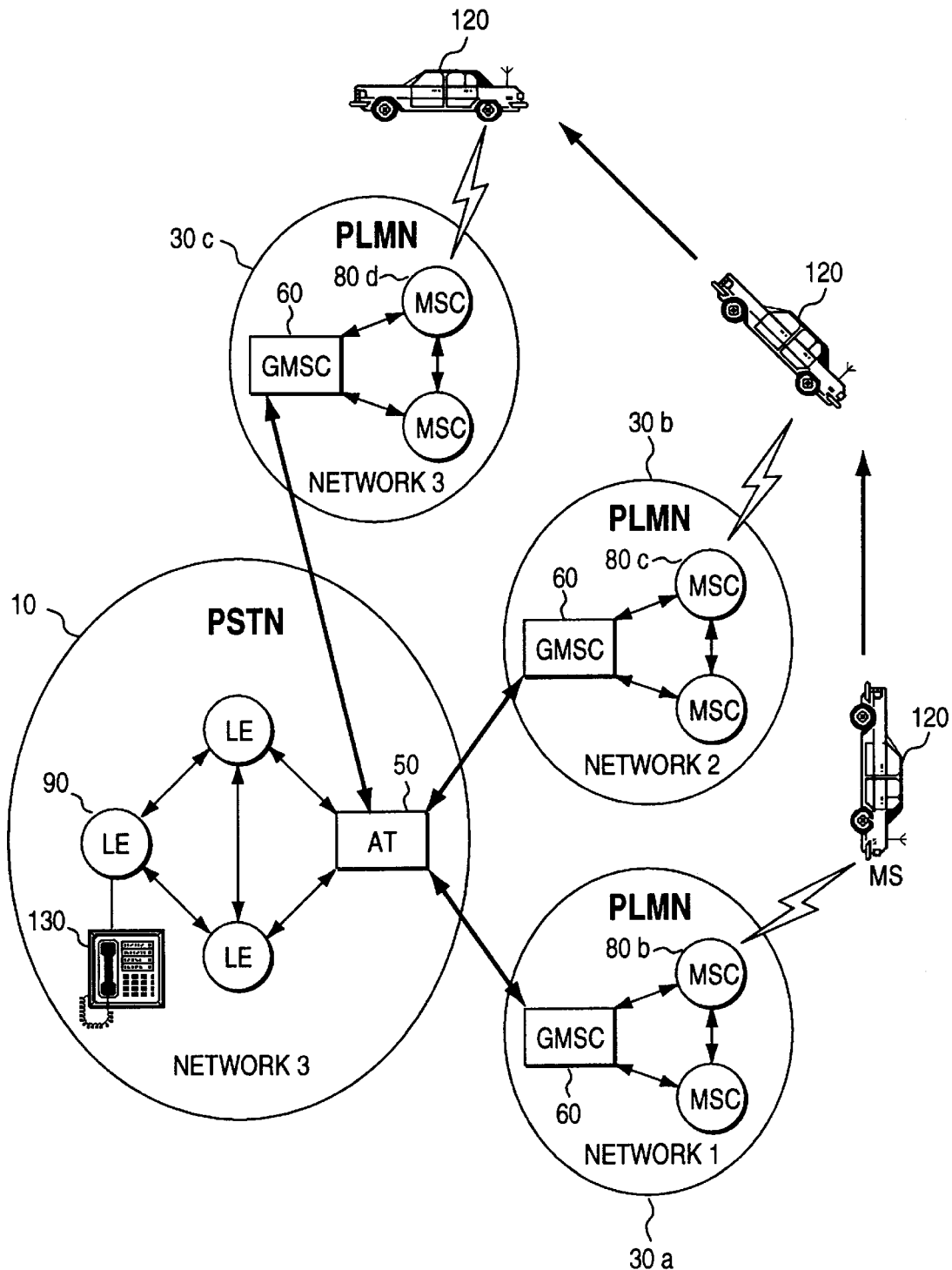
FIG. 3 illustrates interexchange handoffs between multiple PLMNs to enable a single mobile subscriber to use more than one MTSO to make a call.

FIG. 3 illustrates interexchange handoffs between multiple PLMNs 30 to enable a single mobile subscriber to utilize more than one MTSO during roaming. For exemplary purposes, the MS 120 initially originates or terminates a call within its home PLMN 30a to or from a wire-line terminal 130 serviced by a local exchange (LE) 90 within the PSTN 10. As the MS 120 is in conversation with the wire-line subscriber 130, the MS 120 travels outside of its coverage area and roams into the coverage area of another PLMN 30b. After confirming that there is an agreement between the MTSO serving the home PLMN 30a and the MTSO serving the new PLMN 30b to provide roaming services to each other's mobile subscribers, an interexchange handoff is initiated from the home PLMN 30a toward the PLMN 30b. The radio connection or leg 102 between one of the BSSs within the home PLMN 30a and the MS 120 is released, and a new leg 104 is established between one of the BSSs associated with the PLMN 30b and the MS 120. Accordingly, even though the MS 120 is still in communication with the same wire-line subscriber 130, a different PLMN with a different radio connection is servicing the MS 120. This PLMN 30b continues to provide telecommunications service to the MS 120 while the MS is within its coverage area. If the MS 120 travels outside of its coverage area into the coverage area of yet another PLMN 30(c), another interexchange handoff occurs from the PLMN 30b toward the PLMN 30c. Once again, the radio connection 104 between one of the BSSs within PLMN 30b and the MS 120 is released, and a new radio connection is established between one of the MSs within PLMN 30c and the traveling MS 120.

Effectively, the MS 120 has utilized three communications legs during roaming, the communication leg 102 between the MS 120 and the home PLMN 30a, the leg 104 between the MS 120 and the PLMN 30b, and finally the leg 106 between the MS 120 and the PLMN 30c to communicate with the wire-line subscriber 130. Even though the radio connections between the MS 120 and the PLMNs 30 have been transferred twice, they are still part of a single mobile call as far as the mobile subscriber is concerned and only one billing statement should be produced as a result of these services. Conventionally, as soon as the MS 120 terminates its roaming call or travels outside of the coverage areas of a serving exchange, the serving exchange produces the billing records for the call and transports them back to the anchor exchange via the same telecommunication network used by the cellular system for traffic purposes. Upon receipt of the billing records from these serving exchanges, the anchor exchange consolidates the data and produces a single TT record for that particular call.

Even though these billing data have low priority and give deference to other voice and signalling data, they still impose communication burden on the system and create undesirable effects on the traffic load of the overall network. Accordingly, it would be advantageous to instead provide a unique network call identifier that could be used as a label to correlate billing records representing different legs provided by different serving exchanges into a single mobile call. By generating and communicating such a unique network call identifier across the networks as a mobile subscriber travels between different networks, the serving exchanges no longer have to transport the produced billing records back to the anchor exchange in real time. Serving exchanges can output the produced billing records to a separate network or to a magnetic tape and have another source, such as a billing center, correlate the number of different billing records produced for the same mobile call by merely matching up the unique network call identifiers.

Accordingly, the unique network call identifier must not only be unique within a single PLMN, but must be uniquely identifiable across a number of different networks. Consequently, the identifier must be determined from the overall network level rather than from each exchange level to avoid the pure chance of two different exchanges assigning the same identifier to two different calls. Consequently, in order to generate this network level unique call identifier, cellular exchanges must agree or communicate with each other to use the same assigning scheme or mechanism. Alternatively, each exchange must be interconnected with each other using the same protocol or networking. Therefore, the present invention discloses a system for using the most prevalently existing SS7 network to generate the above call identifier.

Each individual exchange connected to the SS7 network is assigned a unique SS7 network signalling address. Because of its unique SS7 network signalling address and global title translation, data can be transmitted by a local exchange without the local exchange knowing exactly where the destination exchange is located. The uniqueness of each exchange along with the global routing mechanism guarantees that the data will be delivered to the proper node.

In accordance with the teachings of the present invention, the above SS7 network signalling address is used as part of the unique network call identifier. One common characteristic that all nodes or exchanges of interest have in the SS7 network is a signalling address. An example of such a signalling address is the point code address comprising a network, cluster, and cluster member. Another example is the global title address. These addresses serve to uniquely identify a point in the network. The significance of this is the fact that if one of these addresses is prepended to a number, and the rest of the number is generated in such a manner that it is unique within that network node, then the number generated becomes unique across the network. This network-wide uniqueness is not only independent of any other administrative procedure (such as changing of the network address on an existing exchange) but is the most fundamentally required component of an identifier which can then be used to correlate records pertaining to a particular call and generated from different points in the networks.

Figure 4:
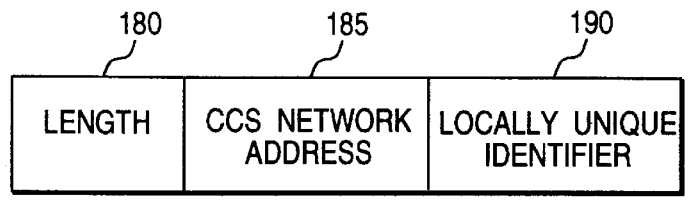
FIG. 4 is a block diagram illustrating the exemplary structure of the unique network call identifier in accordance with the teachings of the present invention.

Accordingly, FIG. 4 is a block diagram illustrating an exemplary structure of the unique network call identifier in accordance with the teachings of the present invention. The first portion of the network call identifier is the length 180 of the overall data. The second portion of the network call identifier is the common channel signalling (CCS) SS7 network address 185 assigned to the serving exchange. The final portion of the identifier appended to the above two data is the local identifier 190 uniquely identifying the call within a local exchange. This local identifier could be constructed based on subscriber ID, group ID, subscription number, etc. Another simple way of guaranteeing a locally unique number is to create an idle queue containing a list of identifiers. When a new call needs to be assigned, the next identifier in the idle queue is retrieved and appended to the SS7 network address. When a call terminates, the released call identifier is returned and stored back into the idle queue.

The advantage of the above format is that the SS7 network address would always be fixed length. Therefore, the length of the local identifier would simply be the length 180 minus the length of the SS7 network address. Accordingly, this gives some flexibility in accommodating exchanges with different call capacity. For instance, an exchange expecting to have one million outstanding calls at any one time could append a 20 bit identifier drawn from an idle pool. A small exchange which has use for just one call (for example a message router) would not need to add anything at all to the SS7 network address.

Figure 5:
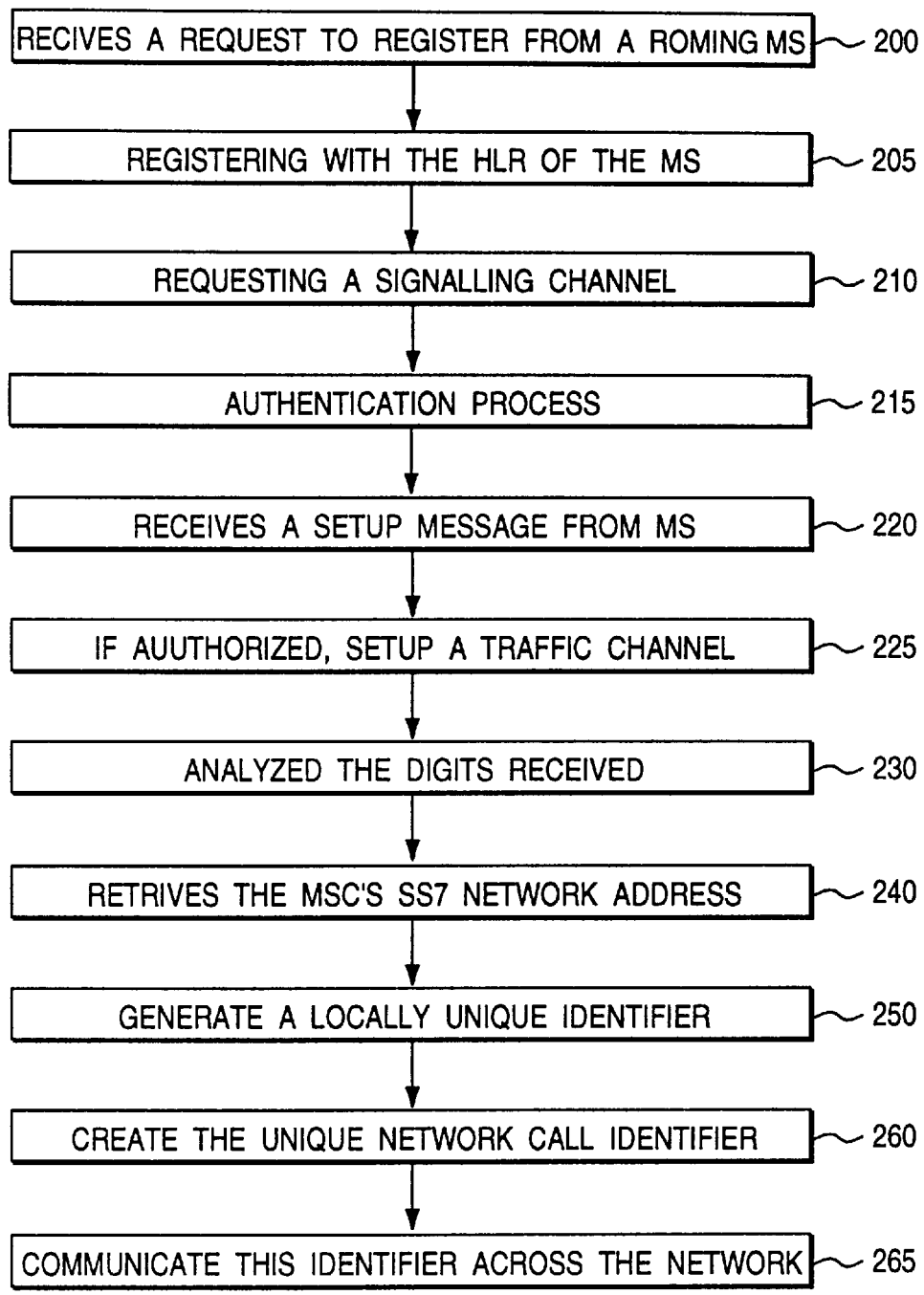
FIG. 5 is a flowchart illustrating steps performed by the system of the present invention to assign a unique network call identifier for an originating call within a serving MSC.

FIG. 5 is a flowchart illustrating the process used to assign a unique network call identifier for an originating call within a serving MSC. Even though for exemplary purposes the MSC within a serving exchange is used to construct the network call identifier, any other elements within a mobile switching system containing a unique network address, such as an HLR, could be used instead.

A number of steps are involved in a call which is originated from a mobile station. Some preconditions must have already been met, such as registration of the mobile within the PLMN and the VLR of that MSC. Basically, a mobile station requests telecommunication service from a serving exchange at step 200. The serving exchange, in turn, communicates with the mobile station's home exchange to confirm that the mobile station has access and permission to use the telecommunication services at step 205. Next, the MS requests a signalling channel with which to communicate with the network at step 310. The MSC/VLR analyzes the identity of the mobile station (MSI) and marks that mobile station as busy in the VLR. Authentication may be performed at this stage at step 215. Location updating and ciphering may also be initiated at this point. The mobile station now sends a setup message which states what kind of service is being requested and, in the case of call establishment, the number which the subscriber wishes to call at step 220. If the subscriber is authorized to originate calls, the call setup proceeds by the establishment of a link between the MSC and the BSC, and the allocation of a traffic channel for the call at step 225. Assuming there is an available idle traffic channel, the BSC will order the BTS (base station) to activate this channel. Once the channel is activated, the BTS acknowledges the order to the BSC, and the BSC in turn informs the MSC. The MSC then informs the MS that the channel assignment has been performed. At this point in the call, there is a channel open from the MSC/VLR to the MS, but no call has been established to the destination pointed out by the digits. Typically, these digits are now analyzed which will lead to the pointing out of, for instance, a trunk to another exchange, another mobile connected within the same MSC/VLR, etc., at step 230. The network address assigned to the serving MSC is then retrieved at step 240. Furthermore, the next available local identifier is retrieved from the idle queue at step 250. Using the SS7 network address as the most significant digits and the local identifier as the rest, a network call identifier is constructed. Lastly, the length of the above newly generated network call identifier is determined and prepended to the network call identifier. If the mobile subscriber travels outside of the serving exchange's coverage area, the above network call identifier is communicated to the neighboring exchange while processing the interexchange handoff.

Figure 6:
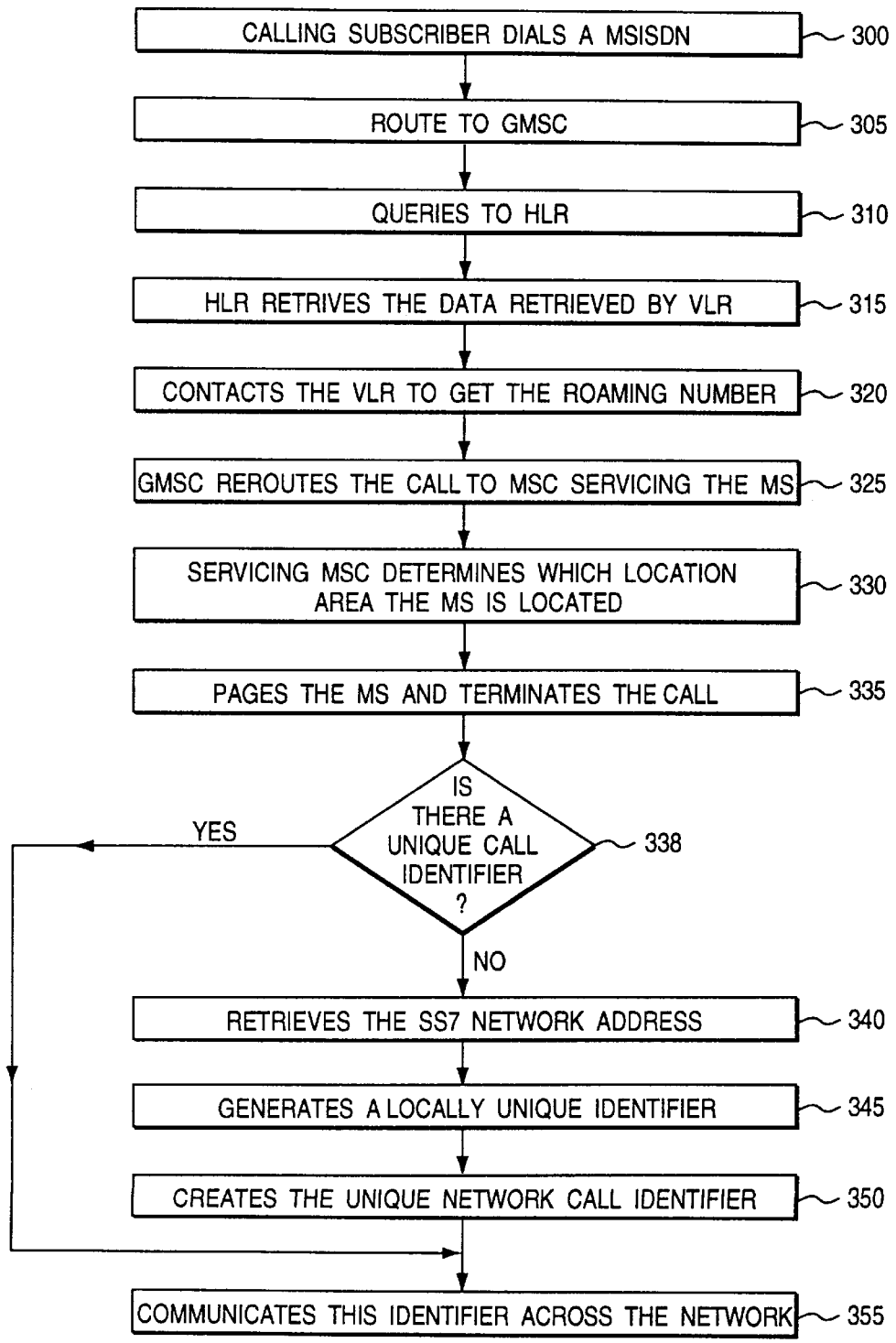
FIG. 6 is a flowchart illustrating steps performed by the system of the present invention to assign a unique network call identifier for a terminating call within a serving MSC.

FIG. 6 is a flowchart illustrating the process used to assign a unique network call identifier for a terminating call within a serving MSC. Once again, the network address of an MSC associated with the serving exchange is used to construct the unique network call identifier. However, any other node, such as an HLR with its own unique network address can be used to create the unique call identifier.

The most obvious distinguishing component of a terminating call to a mobile station from a wire-line terminal is the fact that the network where the call originates does not know where the mobile station is physically located. The number which is dialed at step 300 to reach a mobile station is called the Mobile Station Integrated Service Digital Network (MSISDN) number. The exchange where the call originates analyzes the number (or part of the number) and routes the call to a GMSC belonging to the PLMN which is pointed out as the "owner" of the subscription associated with the MSISDN number at step 305. This GMSC, in turn, analyzes the number in order to find out to which HLR this number belongs. The GMSC then queries the HLR in order to find out how, or if, the call should be routed at step 310. The HLR uses the MSISDN number to find the associated International Mobile Subscriber Identifier (IMSI) which is a number only used within the signalling network. At the same time, the HLR finds the data associated with the subscription as well as the location information which has been sent by the VLR currently serving the mobile station at step 315. In the normal case, the HLR then contacts the VLR in order to get a roaming number at step 320. This roaming number is the number which can be used by the GMSC to reroute the call from the GMSC to the MS currently servicing the mobile station at step 325. Once the call arrives at the MSC/VLR, the MSC consults its own data records in order to determine in which location area the subscriber is located at step 330. The MSC then orders paging of the mobile station via the BSC associated with that location area at step 335. The BSC, in turn, orders the appropriate BTSs to perform paging. After the paging has been successful, the serving MSC determines if a unique network call identifier has been received over the network at step 338. If there has been no network identifier communicated over the network, the SS7 network address assigned to the visited MSC is retrieved at step 345. Furthermore, the next available local identifier is retrieved from the idle queue at step 350. Using the retrieved SS7 network address assigned to the visited MSC as the most significant digits and the local identifier as the rest, a unique network call identifier is constructed. This unique network call identifier, whether received over the network or newly created, along with its length is communicated to other serving exchanges at step 355 if the mobile subscriber ever travels outside of the current coverage area. After the call has been terminated or the mobile subscriber has traveled outside of the current coverage area, the serving exchange produces a billing record identified by the above unique network call identifier and outputs to a separate network or to a magnetic tape.

Figure 7:
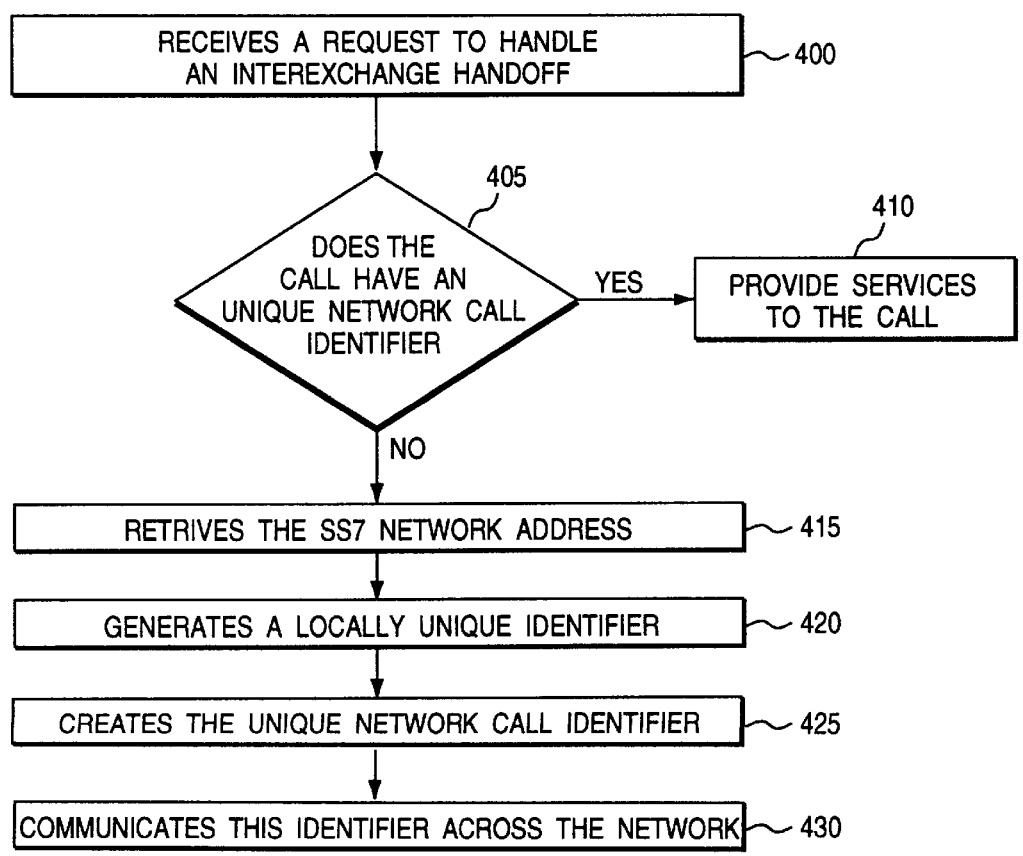
FIG. 7 is a flowchart illustrating steps performed by the system of the present invention to assign a unique network call identifier for an interexchange handoff call within a serving MSC.

FIG. 7 is a flowchart illustrating the process used to assign a unique network call identifier for an interexchange handoff call within a serving MSC. If a mobile call has been originated or terminated by a first exchange and the mobile subscriber associated with that mobile call travels into an area covered by a second serving exchange, the second exchange receives a request to handle an interexchange handoff from the first exchange at step 400. The second serving exchange determines whether the call has already been assigned a unique network call identifier at step 405. If the network call identifier has already been assigned, then the conventional interexchange handoff occurs and the serving exchange starts providing telecommunications services to the newly arrived roaming subscriber at step 410. However, if the call has not been assigned a network call identifier, then the SS7 network address assigned to the MSC servicing the roaming mobile subscriber is retrieved at step 415. The next available local identifier is also retrieved from the idle queue at step 420. Once again, using the retrieved SS7 network address as the most significant digits and the next available local identifier as the rest, a new unique network call identifier is constructed. If the first exchange is able to receive the data, this newly constructed network call identifier is also communicated back to the first exchange. Moreover, if the mobile subscriber travels outside of the current coverage area, a new interexchange handoff request with the above network call identifier is communicated to the next serving exchange at step 430. Eventually, all participating exchanges for that particular call produce billing records labeled with that network call identifier to allow the billing center to collate a number of different records coming from different exchanges to a single call.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims. For instance, the invention may alternatively be implemented in a wireline telecommunications network to identify a call as the call is forwarded through a number of different networks.

What is claimed is:

1. A method of identifying a mobile subscriber call within a wireless cellular network including a plurality of nodes, wherein each of said nodes es assigned a network signaling address, said method comprising the steps of:

retrieving said network signaling address associated with a certain one of said nodes servicing said mobile subscriber call;

generating a local call identifier locally identifying said mobile subscriber call;

concatenating said network signaling address and said local call identifier to generate a unique network call identifier for said mobile subscriber call; and associating said unique network call identifier with said mobile subscriber call at more than one node of said plurality of nodes, said more than one node serving said mobile subscriber call, wherein said seep of associating further the steps of:

receiving an interoffice hand-off request for a mobile subscriber call by a first exchange from a second exchange;

determining whether said mobile subscriber call received from said interoffice hand-off request has been assigned a unique network call identifier; and if said call is not assigned a unique network call identifier, then defining said first exchange as said certain one of the nodes.

2. The method of claim 1 wherein said certain one of the nodes comprises a mobile switching center (MSC).

3. The method of claim 1 wherein said certain one of the nodes comprises a home location register (HLR).

4. The method of claim 1 wherein said step of concatenating further comprises the steps of:

determining a length of said unique network call identifier; and prefixing a value representing said length to said unique network call identifier.

5. The method of claim 1 wherein said step of concatenating further comprises the steps of:

assigning said retrieved network signalling address as the most significant digits of said unique network call identifier; and assigning said generated local call identifier as the remaining digits of said unique network call identifier.

6. The method of claim 1 further comprising the step of communicating said unique call identifier across said plurality of node.

7. The method of claim 1, wherein said network signalling address is a Signalling System No. 7 (SS7) point code address, said point code address further comprising network address, cluster address, and cluster member address.

8. The method of claim 1, wherein said network signalling address is a Signalling System No. 7 (SS7) global title address.

9. The method of claim 1 further comprising the initial step of receiving a request to originate a call from said mobile subscriber at an exchange, said exchange at which said request is received defining said certain one of the nodes.

10. The method of claim 1 further comprising the initial step of receiving a terminating call to an exchange servicing said mobile subscriber, said exchange at which said termination is received defining said certain one of the nodes.

11. A system for identifying a mobile subscriber call within a wireless cellular network including a plurality of nodes, wherein each of said node is assigned a network signaling address, said system comprising:

means for retrieving said network signaling address associated with a certain one of said nodes servicing said mobile subscriber call;

means for generating a local call identifier locally identifying said mobile subscriber call;

means for concatenating said network signaling address and said local call identifier to generate a unique network call identifier for said mobile subscriber call; and means for associating said unique network call identifier with said mobile subscriber call at more than one node of said plurality of nodes, said more than one node serving said mobile subscriber call, wherein said means for associating further comprises:

means for determining whether said mobile subscriber call received from an interoffice hand-off request has been assigned a unique network call identifier; and means for defining said first exchange as said certain one of the nodes responsive to the determination that said call has not been assigned a unique network call identifier.

12. The system of claim 11 wherein said certain one of the nodes comprises a mobile switching center (MSC).

13. The system of claim 11 wherein said certain one of the nodes comprises a home location register (HLR).

14. The system of claim 11 wherein said means for concatenating further comprises:

means for determining a length of said unique network call identifier; and means for prefixing a value representing said length to said unique network call identifier.

15. The system of claim 11 wherein said means for concatenating further comprises:

means for assigning said retrieved signalling address as the most significant digits of said unique network call identifier; and means for assigning said generated call identifier as the remaining digits of said unique network call identifier.

16. The system of claim 11 further comprises the means of communicating said unique call identifier across said plurality of nodes.

17. The system of claim 11, wherein said network signalling address is a Signalling System No. 7 (SS7) point code address, said point code address further comprising network address, cluster address, and cluster member address.

18. The system of claim 11, wherein said network signalling address is a Signalling System No. 7 (SS7) global title address.

19. The system of claim 11 further comprising the means for receiving a request to originate a call from said mobile subscriber at an exchange, said exchange at which said request is received defining said certain one of the nodes.

20. The system of claim 11 further comprising the means for receiving a terminating call to an exchange servicing said mobile subscriber, said exchange at which said termination is received defining said certain one of the nodes.

21. A method of identifying a mobile subscriber call within a Public Land Mobile Networks (PLMN), said PLMN including a plurality of exchanges, said method comprising the steps of:

selecting a particular exchange within a certain one of said PLMNs servicing said mobile subscriber call;

retrieving a network signaling address associated with said particular exchange;

generating a local call identifier locally identifying said mobile subscriber call within said particular exchange;

concatenating said network signaling address and said local call identifier to generate a unique network call identifier for said mobile subscriber call; and associating said unique network call identifier with said mobile subscriber call at more than one exchange servicing said mobile subscriber call, the step of associating including the steps of:

performing an interoffice hand-off of said mobile subscriber call from said particular exchange to another exchange;

sending said unique network call identifier from said particular exchange to said another exchange in connection with the interoffice hand-off; and using said unique network call identifier at said another exchange to identify said mobile subscriber call following hand-off.

22. The method of claim 21 wherein said step of concatenating further comprises the step of:

determining a length of said unique network call identifier; and prefixing a value representing said length to said unique network call identifier.

23. The method of claim 18 wherein said particular exchange comprises a mobile switching center (MSC).

24. The method of claim 18 wherein said network signalling address comprises a Signalling System No. 7 (SS7) point code address, said point code address further comprising network address, cluster address, and cluster member address.

25. The method of claim 18 wherein said network signalling address comprises a Signalling System No. 7 (SS7) global title address.

26. A method of identifying a mobile subscriber call within a wireless cellular network including a plurality of exchanges, said method comprising the steps of:

generating at a first exchange a unique network call identifier for said mobile subscriber call;

generating at said first exchange handling that mobile subscriber call a toll ticket for mobile subscriber call utilizing that unique network call identifier;

performing an interoffice hand-off of said mobile subscriber call from said first exchange to a second exchange;

sending said unique network call identifier from said first exchange to said second exchange in connect with the interoffice hand-off; and generating at said second exchange a second toll ticket for said mobile subscriber call, said second toll ticket utilizing that same unique network call identifier.

27. The method of claim 26 wherein said step of generating a unique network call identifier further comprises the steps of:

retrieving a network address associated with said first exchange;

generating a local call identifier locally identifying said mobile subscriber call; and concatenating said network signaling address and said local call identifier to generate said unique identifier for said mobile subscriber call.

\* \* \* \* \*

UNITED STATES PATENT AND TRADEMARK OFFICE
CERTIFICATE OF CORRECTION

PATENT NO.   : 6,070,076
DATED        : May 30, 2000
INVENTOR(S)  : Eric L. Valentine It is certified that error appears in the above-identified patent and that said Letters Patent is hereby corrected as shown below:

Column 8,
Line 60, replace "es" with -- is --

Column 9,
Line 7, replace "seep" with -- step --
Line 8, replace "further the" with -- further comprises the --

Column 11,
Lines 20, 23 and 28, replace "18" with -- 21 --

Column 12,
Line 14, replace "connect" with -- connection --

Signed and Sealed this

Fifth Day of August, 2003

JAMES E. ROGAN
*Director of the United States Patent and Trademark Office*